(12) United States Patent
Nielsen et al.

(10) Patent No.: US 7,695,859 B2
(45) Date of Patent: Apr. 13, 2010

(54) INSULATIVE FEED THROUGH ASSEMBLY FOR ELECTROCHEMICAL DEVICES

(75) Inventors: Christian S. Nielsen, River Falls, WI (US); Timothy T. Bomstad, Inver Grove Heights, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 12/038,113

(22) Filed: Feb. 27, 2008

(65) Prior Publication Data
US 2008/0292958 A1 Nov. 27, 2008

Related U.S. Application Data

(62) Division of application No. 10/463,148, filed on Jun. 17, 2003, now Pat. No. 7,348,097.

(51) Int. Cl.
*H01M 2/08* (2006.01)
(52) U.S. Cl. ............... 429/180; 429/181; 429/184; 29/25.03
(58) Field of Classification Search ............ 429/180, 429/181, 184; 29/25.03
See application file for complete search history.

(56) References Cited

U.S. PATENT DOCUMENTS

| | | | |
|---|---|---|---|
| 4,495,260 A | 1/1985 | Hardigg et al. | |
| 4,508,797 A | 4/1985 | Knoedler et al. | |
| 5,104,755 A | 4/1992 | Taylor et al. | |
| 5,312,458 A | 5/1994 | Muffoletto et al. | |
| 5,926,357 A | 7/1999 | Elias et al. | |
| 6,183,905 B1 | 2/2001 | Ling | |
| 6,191,931 B1 | 2/2001 | Paspa et al. | |
| 6,212,063 B1 | 4/2001 | Johnson et al. | |
| 6,219,222 B1 | 4/2001 | Shah et al. | |
| 6,334,879 B1 | 1/2002 | Muffoletto et al. | |
| 6,472,089 B1 | 10/2002 | Stricker et al. | |
| 6,498,951 B1 | 12/2002 | Larson et al. | |
| 6,506,083 B1 | 1/2003 | Bickford et al. | |

FOREIGN PATENT DOCUMENTS

EP    0 877 400 A    11/1998

OTHER PUBLICATIONS

International Search Report, PCT/US2004/019257, Feb. 12, 2005, 8 Pages.

*Primary Examiner*—Jane Rhee

(57) ABSTRACT

An insulative feedthrough receives an electrical lead therethrough and includes a ferrule having first and second open ends and an interior surface. At least one polymeric guide member is positioned substantially within the first end of the ferrule and has an aperture therethrough for receiving the lead. An insulating material is deposited in the ferrule through the second end for sealingly engaging the lead and the interior surface of the ferrule.

12 Claims, 7 Drawing Sheets

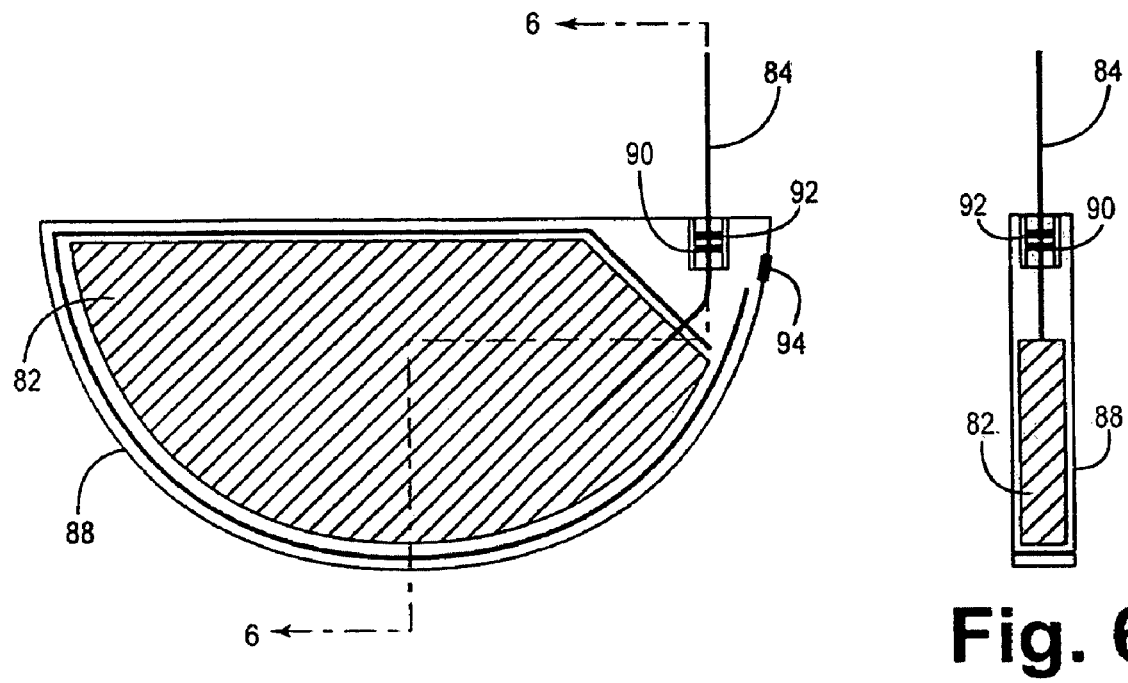
Fig. 5
Fig. 6
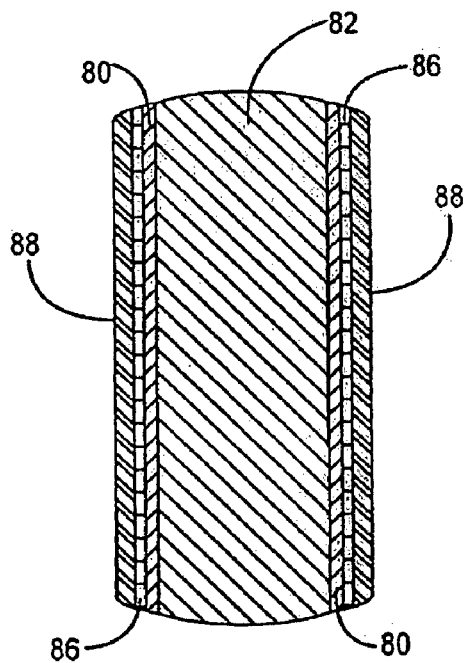
Fig. 7

INSULATIVE FEED THROUGH ASSEMBLY FOR ELECTROCHEMICAL DEVICES

CROSS REFERENCE TO PRIORITY APPLICATION

This application is a divisional of U.S. patent application Ser. No. 10/463,148, filed Jun. 17, 2003, now U.S. Pat. No. 7,348,097, which is herein incorporated by reference in its entirety.

FIELD OF THE INVENTION

The present invention generally relates to electrochemical components, and more particularly to an epoxy compression feedthrough assembly for use in electrolytic capacitors, batteries and the like utilized in conjunction with implantable medical devices.

BACKGROUND OF THE INVENTION

The trend toward reductions in the size and thickness of implantable medical devices such as implantable cardioverter-defibrillators (ICDs) has led to the need for miniaturization of the electrochemical components utilized in such devices. Capacitors, for example, are employed in ICDs typically implanted in a patient's chest to treat very fast, and potentially lethal, cardiac arrhythmias. These devices continuously monitor the heart's electrical signals and sense if, for instance, the heart is beating dangerously fast. If this condition is detected, the ICD can deliver one or more electric shocks, within about five to ten seconds, to return the heart to a normal heart rhythm. These electrical stimuli may range from a few micro-joules to very powerful shocks of approximately twenty-five joules to forty joules.

Early generations of ICDs utilized high-voltage, cylindrical capacitors to generate and deliver defibrillation shocks. For example, standard wet slug tantalum capacitors generally have a cylindrically shaped conductive casing serving as the terminal for the cathode and a tantalum anode connected to a terminal lead electrically insulated from the casing. The opposite end of the casing is also typically provided with an insulator structure.

One such capacitor includes a metal container that functions as a cathode. A porous coating, including an oxide of a metal selected from a group consisting of ruthenium, iridium, nickel, rhodium, platinum, palladium, and osmium, is disposed proximate an inside surface of the container and is in electrical communication therewith. A central anode selected from the group consisting of tantalum, aluminum, niobium, zirconium, and titanium is spaced from the porous coating, and an electrolyte within the container contacts the porous coating and the anode.

While the performance of these capacitors was acceptable for defibrillator applications, efforts to optimize the mechanical characteristics of the device have been limited by the constraints imposed by the cylindrical design. In an effort to overcome this, flat electrolytic capacitors were developed. One such capacitor comprises a deep-drawn sealed capacitor having a generally flat, planar geometry. The capacitor includes at least one electrode provided by a metallic substrate in contact with a capacitive material. The coated substrate may be deposited on a casing side-wall or connected to a side-wall. The capacitor has a flat planar shape and utilizes a deep-drawn casing comprised of spaced apart side-walls joined at their periphery by a surrounding intermediate wall.

Cathode material is typically deposited on an interior sidewall of the conductive encasement which serves as the negative terminal for the electrolytic capacitor, though such material may also be deposited on a separate substrate and electrically coupled to the capacitor encasement. The other capacitor terminal (i.e. the anode) is isolated from the encasement by an insulator or feedthrough structure including, for example, a glass-to-metal seal. In accordance with one known technique, an anode lead (e.g. tantalum) imbedded into the anode is laser welded to a terminal lead that passes through the ferrule. This anode lead-to-feedthrough terminal weld joint (i.e. cross-wire weld) is formed by shaping one or more of the leads into a "U" or "J" shape, pressing the terminal ends of the leads together, and laser welding the interface.

A valve metal anode made-from metal powder is pressed and sintered to form a porous structure, and a wire (e.g. tantalum) is imbedded into the anode during pressing to provide a terminal for joining to the feedthrough. A separator (e.g. polyolefin, a fluoropolymer, a laminated film, non-woven glass, glass fiber, porous ceramic, etc.) is provided between the anode and the cathode to prevent short circuits between the electrodes. Separator sheets are sealed either to a polymer ring that extends around the perimeter of the anode or to themselves.

A separate weld ring and polymer insulator may be utilized for thermal beam protection as well as anode immobilization. Prior to encasement welding, a separator encased anode is joined to the feedthrough wire by, for example, laser welding. This joint is internal to the capacitor. The outer metal encasement structure is comprised essentially of two symmetrical half shells that overlap and are welded at their perimeter seam to form a hermetic seal. This weld is referred to as a rotary weld since the part is welded as it rotates on its side rather than employing a top-down approach. Alternatively, a top-own approach may be utilized to weld a lid onto a deep-drawn container. After welding, the capacitor is filled with electrolyte through a port in the encasement.

The above described techniques present concerns relating to both device size and manufacturing complexity. The use of overlapping half-shields results in a doubling of the encasement thickness around the perimeter of the capacitor thus reducing the available interior space for the capacitor's anode. This results in larger capacitors. Space for the anode material is further reduced by the presence of the weld ring and space insulator. In addition, manufacturing processes become more complex and therefore more costly, especially in the case of a deep-drawn encasement.

The abovementioned method of joining an anode lead to a terminal lead was found to be problematic, however, as the step of cross-wire welding must be performed prior to welding the feedthrough ferrule to the capacitor encasement or sufficient space must be provided in the capacitor anode structure to facilitate clamping and welding following ferrule welding. Producing the cross-wire weld prior to ferrule welding subjects the materials employed in the feedthrough seal to thermal stress and increases the cost and complexity of manufacture. Conversely, performing cross-wire welding after ferrule welding has a negative impact on volumetric efficiency.

As mentioned above, it is common for the anode terminal to be isolated from the encasement by an insulator or feedthrough structure comprised including a glass-to-metal seal. Such seals are well known in the art. To avoid problems which may be encountered due to the rigidity of glass-to-metal seals, polymer-to-metal seals have been employed. For example, it is known to secure an anode lead within a ferrule by means of a series of polymeric sealing layers. These layers may comprise a first layer of a synthetic polymeric material forming a plug on end of the ferrule internal to the electrolytic cell, a second layer of synthetic polymeric material disposed within the ferrule, and a third layer of glass disposed within the ferrule to provide a hermetic seal. Similar assemblies, varying in the arrangement and/or shape of the polymeric layers, are also known. Unfortunately, current methods of manufacturing such assemblies are relatively complex, time-consuming, and expensive.

It should thus be appreciated that it would be desirable to provide an electrochemical device including an improved feedthrough assembly that is volumetrically efficient and simple to manufacture.

BRIEF SUMMARY OF THE INVENTION

According to a broad aspect of the invention there is provided an insulative feedthrough for receiving an electrical lead therethrough. The feedthrough includes a ferrule having first and second open ends and an interior surface. At least one polymeric guide member is positioned substantially within the ferrule proximate the ferrule's first end and has an aperture therethrough for receiving the lead. An insulating material is deposited in the ferrule through the ferrule's second end for sealingly engaging the lead and the ferrule's interior surface.

According to a further aspect of the invention there is provided a method for feeding a terminal lead through an encasement wall of an electrochemical cell of the type utilized in implantable medical devices to the exterior of the electrochemical cell. A ferrule having first and second ends is positioned through the encasement wall. The ferrule is provided with an aperture having an inner surface. At least one polymeric guide member having an aperture therein is positioned proximate the first end of the ferrule. The lead is received through the guide member and the remainder of the ferrule. An insulating material is then deposited in the ferrule through the ferrule's second end so as to sealingly engaging the lead and the interior surface.

According to a still further aspect of the invention there is provided an electrochemical cell for use in an implantable medical device. The electrochemical cell comprises a shallow drawn encasement having at least one electrode body disposed within the encasement. An electrical lead is coupled to the body, and an insulative feedthrough is coupled through the encasement for receiving the electrical lead therethrough. The insulative feedthrough comprises a ferrule having first and second open ends and an interior surface. At least one polymeric guide member is positioned substantially within the ferrule proximate the ferrule's first end. An aperture is provided within the guide member for receiving the lead. An insulating material for sealingly engaging the lead and the interior surface is deposited within the ferrule through the ferrule's second end.

BRIEF DESCRIPTION OF THE DRAWINGS

The present invention will hereinafter be described in conjunction with the following drawing figures, wherein like numerals denote like elements.

FIGS. 5, 6, and 7 are front cross-sectional, side cross-sectional, and scaled cross-sectional views of a novel electrolytic capacitor;

DETAILED DESCRIPTION OF THE INVENTION

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
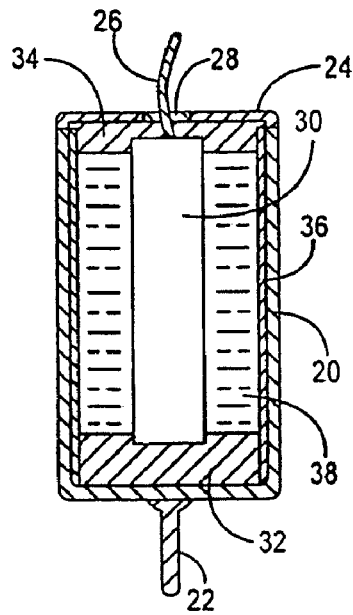
FIG. 1 is a cross-sectional view of an electrolytic capacitor in accordance with the teachings of the prior art.

FIG. 1 is a cross-sectional view of an electrolytic capacitor in accordance with the teaching of the prior art. It comprises a cylindrical metal container 20 made of, for example tantalum. Typically, container 20 comprises the cathode of the electrolytic capacitor and includes a lead 22 that is welded to the container. An end seal of cap 24 includes a second lead 26 that is electrically insulated from the remainder of cap 24 by means of a feed-through assembly 28. Cap 24 is bonded to container 20 by, for example, welding. Feed-through 28 of lead 26 may include a glass-to-metal seal through which lead 26 passes. An anode 30 (e.g., porous sintered tantalum) is electrically connected to lead 26 and is disposed within container 20. Direct contact between container 20 and anode 30 is prevented by means of electrically insulating spacers 32 and 34 within container 20 that receive opposite ends of anode 30. A porous coating 36 is formed directly on the inner surface of container 20. Porous coating 36 may include an oxide of ruthenium, iridium, nickel, rhodium, platinum, palladium, or osmium. As stated previously, anode 30 may be made of a sintered porous tantalum. However, anode 30 may be aluminum, niobium, zirconium, or titanium. Finally, an electrolyte 38 is disposed between and in contact with both anode 30 and cathode coating 36 thus providing a current path between anode 30 and coating 36. As stated previously, while capacitors such as the one shown in FIG. 1 were generally acceptable for defibrillator applications, optimization of the device is limited by the constraints imposed by the cylindrical design.

Figure 4:
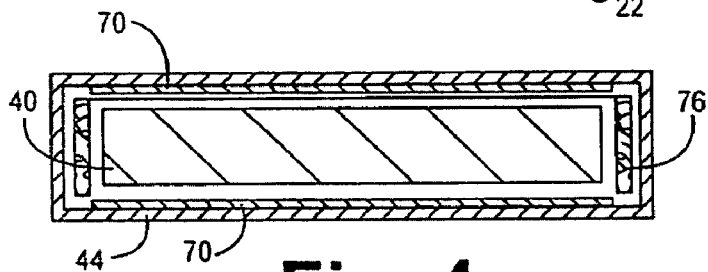
FIGS. 2, 3, and 4 are front, side, and top cross-sectional views of a flat electrolytic capacitor in accordance with the teachings of the prior art.
Figure 2:
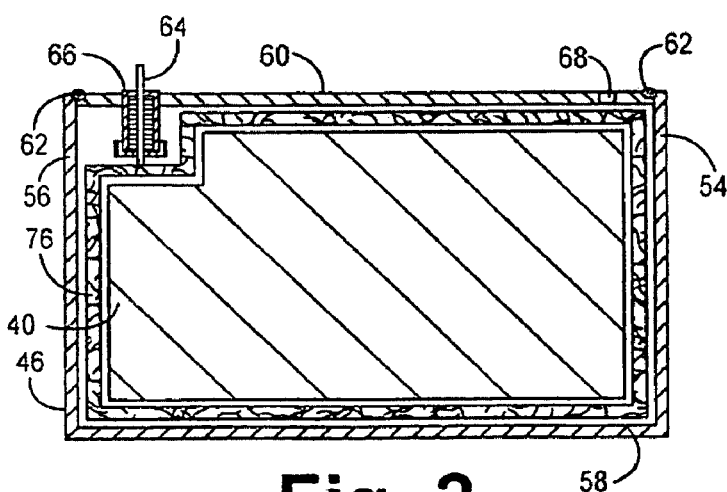
Figure 3:
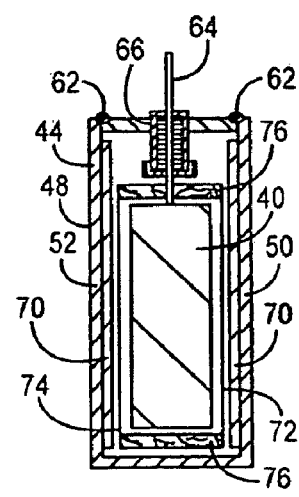

FIGS. 2, 3, and 4 are front, side, and top cross-sectional views respectively of a flat electrolytic capacitor, also in accordance with the teachings of the prior art; designed to overcome some of the disadvantages associated with the electrolytic capacitor shown in FIG. 1. The capacitor of FIGS. 2, 3, and 4 comprises an anode 40 and a cathode 44 housed inside a hermetically sealed casing 46. The capacitor electrodes are activated and operatively associated with each other by means of an electrolyte contained inside casing 46. Casing 46 includes a deep drawn can 48 having a generally rectangular shape and comprised of spaced apart side-walls 50 and 52 extending to and meeting with opposed end walls 54 and 56 extending from a bottom wall 58. A lid 60 is secured to side-walls 50 and 52 and to end walls 54 and 56 by a weld 62 to complete an enclosed casing 46. Casing 46 is made of a conductive metal and serves as one terminal or contact for making electrical connections between the capacitor and its load.

The other electrical terminal or contact is provided by a conductor or lead 64 extending from within the capacitor through casing 46 and, in particular, through lid 60. Lead 64 is insulated electrically from lid 60 by an insulator and seal structure 66. An electrolyte fill opening 68 is provided to permit the introduction of an electrolyte into the capacitor, after which opening 68 is closed. Cathode electrode 44 is spaced from the anode 40 and comprises an electrode active material 70 provided on a conductive substrate. Conductive substrate 70 may be selected from the group consisting of tantalum, nickel, molybdenum, niobium, cobalt, stainless steel, tungsten, platinum, palladium, gold, silver, cooper, chromium, vanadium, aluminum, zirconium, hafnium, zinc, iron, and mixtures and alloys thereof. Anode 40 may be selected from the group consisting of tantalum, aluminum, titanium, niobium, zirconium, hafnium, tungsten, molybdenum, vanadium, silicon, germanium, and mixtures thereof. A separator structure includes spaced apart sheets 72 and 74 of insulative material (e.g. a microporous polyolefinic film). Sheets 72 and 74 are connected to a polymeric ring 76 and are disposed intermediate anode 40 and coated side-walls 50 and 52 which serve as a cathode electrode.

As already mentioned, the above described capacitors present certain concerns with respect to device size and manufacturing complexity. In contrast, FIGS. 5, 6, and 7 are front cross-sectional, side cross-sectional, and scaled cross-sectional views of an electrolytic capacitor suitable for use in an implantable medical device and utilizing a feedthrough assembly in accordance with a first embodiment of the present invention. As can be seen, one or more layers of an insulative polymer separator material 80 (e.g. micro-porous PTFE or polypropylene) are heat sealed around a thin, D-shaped anode 82 (e.g. tantalum) having an anode lead wire 84 (e.g. tantalum) embedded therein. Capacitor grade tantalum powder such as the "NH" family of powders may be employed for this purpose. These tantalum powders have a charge per gram rating of between approximately 17,000 to 23,000 microfarad-volts/gram and have been found to be well suited for implantable cardiac device capacitor applications. Tantalum powders of this type are commercially available from HC Starck, Inc. located in Newton, Mass. Of course, materials having higher or lower charge may be utilized depending upon desired results.

Before pressing, the tantalum powder is typically, but not necessarily, mixed with approximately 0 to 5 percent of a binder such as ammonium carbonate. This and other binders are used to facilitate metal particle adhesion and die lubrication during anode pressing. The powder and binder mixture are dispended into a die cavity and are pressed to a density of approximately 4 grams per cubic centimeter to approximately 8 grams per cubic centimeter. After pressing, it is sometimes beneficial to modify anode porosity to improve conductivity within the internal portions of the anode. Porosity modification has been shown to significantly reduce resistance. Macroscopic channels are incorporated into the body of the anodes to accomplish this. Binder is then removed from the anodes either by washing in warm deionized water or by heating at a temperature sufficient to decompose the binder. Complete binder removal is desirable since residuals may result in high leakage current. Washed anodes are then vacuum sintered at between approximately 1,350 degrees centigrade and approximately 1,600 degrees centigrade to permanently bond the metal anode particles.

An oxide is formed on the surface of the sintered anode by immersing the anode in an electrolyte and applying a current. The electrolyte includes constituents such as water and phosphoric acid and perhaps other organic solvents. The application of current drives the formation of an oxide film that is proportional in thickness to the targeted forming voltage. A pulsed formation process may be used wherein current is cyclically applied and removed to allow diffusion of heated electrolyte from the internal pores of the anode plugs. Intermediate washing and annealing steps may be performed to facilitate the formation of a stable, defect free, oxide.

Layers of cathode material 86 are deposited on the inside walls of a thin, shallow drawn, D-shaped casing 88 (e.g. titanium) having first and second major sides and a peripheral wall each of which have an interior surface. In order to optimize the energy density of the electrolytic capacitor, the cathode capacitance must be several orders of magnitude higher than that of anode 82. In the past, this was accomplished by incorporating thin, etched aluminum foils between many anode layers, thus providing a large planar surface area and high capacitance. However, in order to promote downsizing as described above, the present invention employs materials of a high specific capacitance rather than large planar area. The capacitive materials may be selected from those described above or selected from the group including graphitic or glassy carbon deposited on titanium carbide, silver vanadium oxide, crystalline manganese dioxide, platinum or ruthenium on surface modified titanium, barium titanate or other perovskites on surface modified titanium, crystalline ruthenium or iridium oxide, or the like.

Anode 88 and cathode material 86 are insulated from each other by means of a micro-porous polymer separator material such as a PTFE separator of the type produced by W. L. Gore; Inc. located in Elkton, Md., or polypropylene of the type, produced by Celgard; Inc. located in Charlotte, N.C. Separators 80 prevent physical contact and shorting and also provide for ionic conduction. The material may be loosely placed between the electrodes or can be sealed around the anode and/or cathode. Common sealing methods include heat sealing, ultra sonic bonding, pressure bonding, etc.

The electrodes are housed in a shallow drawn, typically D-shaped case 88 (e.g. titanium) that may have a material thickness of approximately 0.005 to 0.016 inch. An insulating feed-through 90 (to be more fully described hereinbelow) is comprised of a ferrule 92 (e.g. titanium) bonded (as, for example, by welding to case 88) to case 88. Sealed anode 82 is inserted into the cathode coated case 88, and anode lead wire 84 passes through feedthrough 90 as is shown. A lid is then positioned and secured to the case by welding.

After assembly and welding, an electrolyte is introduced into the casing through a fill-port 94. The electrolyte is a conductive liquid having a high breakdown voltage that is typically comprised of water, organic solvents, and weak acids or of water, organic solvents, and sulfuric acid. Filling is accomplished by placing the capacitor in a vacuum chamber such that fill-port 94 extends into a reservoir of electrolyte. When the chamber is evacuated, pressure is reduced inside the capacitor. When the vacuum is released, pressure inside the capacitor re-equilibrates, and electrolyte is pushed through fill-port 94 into the capacitor.

Filled capacitors are aged to form an oxide on the anode leads and other areas of the anode. Aging, as with formation, is accomplished by applying a current to the capacitor. This current drives the formation of an oxide film that is proportional in thickness to the targeted aging voltage. Capacitors are typically aged approximately at or above their working voltage, and are held at this voltage until leakage current reaches a stable, low value. Upon completion of aging, capacitors are re-filled to replenish lost electrolyte, and the fill-port 94 is sealed as, for example, by laser welding a closing button or cap over the encasement opening.

Figure 8:
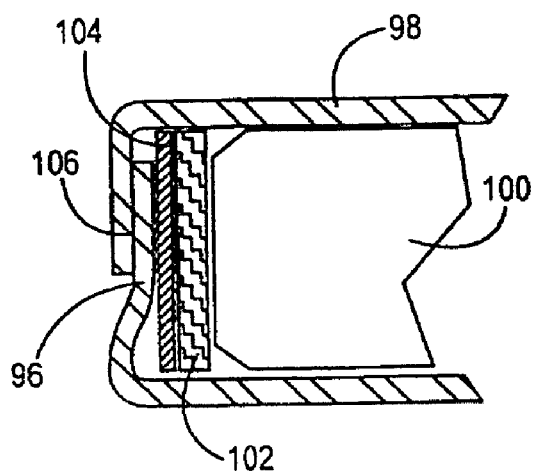
FIG. 8 is a cross-sectional view of a capacitor/anode encasement structure in accordance with the teachings of the prior art.

The outer metal encasement structure of a known planar capacitor generally comprises two symmetrical half shells that overlap and are then welded along their perimeter seam to form a hermetic seal. Such a device is shown in FIG. 8. That is, the encasement comprises a case 96 and an overlapping cover 98. A separator sealed anode 100 is placed within case 96, and a polymer spacer ring 102 is positioned around the periphery of anode assembly 100. Likewise, a metal weld ring 104 is positioned around the periphery of spacer ring 102 proximate the overlapping portion 106 of case 96 and cover 98. The overlapping portions of case 96 and cover 98 are then welded along the perimeter seam to form a hermetic seal.

This technique presents certain concerns relating to both device size and manufacturing complexity. The use of overlapping half-shields results in a doubling of the encasement thickness around the perimeter of the capacitor thus reducing the available interior space for the anode. Thus, for a given size anode, the resulting capacitor is larger. Furthermore, space for anode material is reduced due to the presence of weld ring 104 and insulative polymer spacer ring 102. This device is more complex to manufacture and therefore more costly.

Figure 9:
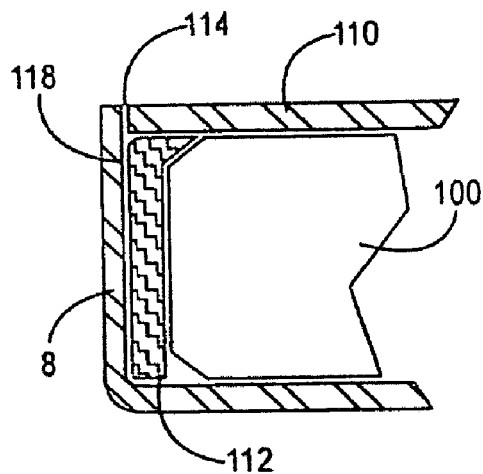
FIG. 9 is a cross-sectional view of a novel capacitor/anode encasement assembly.

FIG. 9 is a cross-sectional view illustrating one of the novel aspects of the present invention. In this embodiment, the encasement is comprised of a shallow drawn case 108 and a cover or lid 110. This shallow drawn encasement design uses a top down welding approach. Material thickness is not doubled in the area of the weld seam as was the situation in connection with the device shown in FIG. 8 thus resulting in additional space for anode material.

Cover 110 is sized to fit into the open side of shallow drawn metal case 108. This results in a gap (e.g. from 0 to approximately 0.002 inches) in the encasement between case 108 and cover 110 that could lead to the penetration of the weld laser beam thus potentially damaging the capacitor's internal components. To prevent this, a metallized polymeric weld ring is placed or positioned around the periphery of anode 100. Weld ring 112 is somewhat thicker than the case-to-cover gap 114 to maximize protection. Metallized weld ring 112 may comprises polymer spacer 116 having a metallized surface 118 as shown and provides for both laser beam shielding and anode immobilization. The metallized polymer spacer 112 need only be thick enough to provide a barrier to penetration of the laser beam and is sacrificial in nature. This non-active component substantially reduces damage to the active structures on the capacitor.

Metallized polymer spacer 112 is placed around the perimeter of anode 100 during assembly and may be produced my means of injection molding, thermal forming, tube extrusion, die cutting of extruded or cast films, etc. Spacer 112 may be provided through the use of a pre-metallized polymer film. Alternatively, the metal may be deposited during a separate process after insulator production. Suitable metallization materials include aluminum, titanium, etc. and mixtures and allows thereof.

Figure 10:
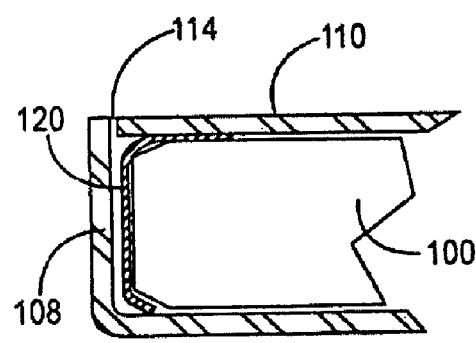
FIG. 10 is a cross-sectional view of an alternative capacitor/anode encasement assembly.

FIG. 10 is a cross-sectional view illustrating an alternative to the embodiment shown in FIG. 9. Again, the encasement comprises a case 108 and a cover or lid 110 resulting in gap 114. The anode assembly 100 is positioned within the encasement as was the situation in FIG. 9. To protect the capacitor's internal components from damage due to the weld laser beam, a metallized tape 120 is positioned around the perimeter of anode 100.

The embodiments shown in FIGS. 9 and 10 not only have space saving aspects in the encasement design, but the components are simple and inexpensive to produce. The top down assembly facilitates fabrication and welding processes. The thinness of the weld ring/spacer 112 or metallized tape 120 reduces the need for additional space around the perimeter of the capacitor thus improving energy density. The design lends itself to mass production methods and reduces costs, component count, and manufacturing complexity.

It is not uncommon for the encasement of the capacitor itself to serve as the cathode electrode. This may be accomplished by depositing cathode material on an inner wall of the encasement or, if cathode material is deposited on one or more substrates, by electrically connecting the substrates to the encasement. Alternatively, the encasement may be made electrically neutral by not coupling the cathode to the encasement. In this situation, however, it is necessary not only to provide access to an anode electrode at the exterior of encasement 88, but provisions must also be made to access a cathode electrode from the exterior of the encasement.

Figure 11:
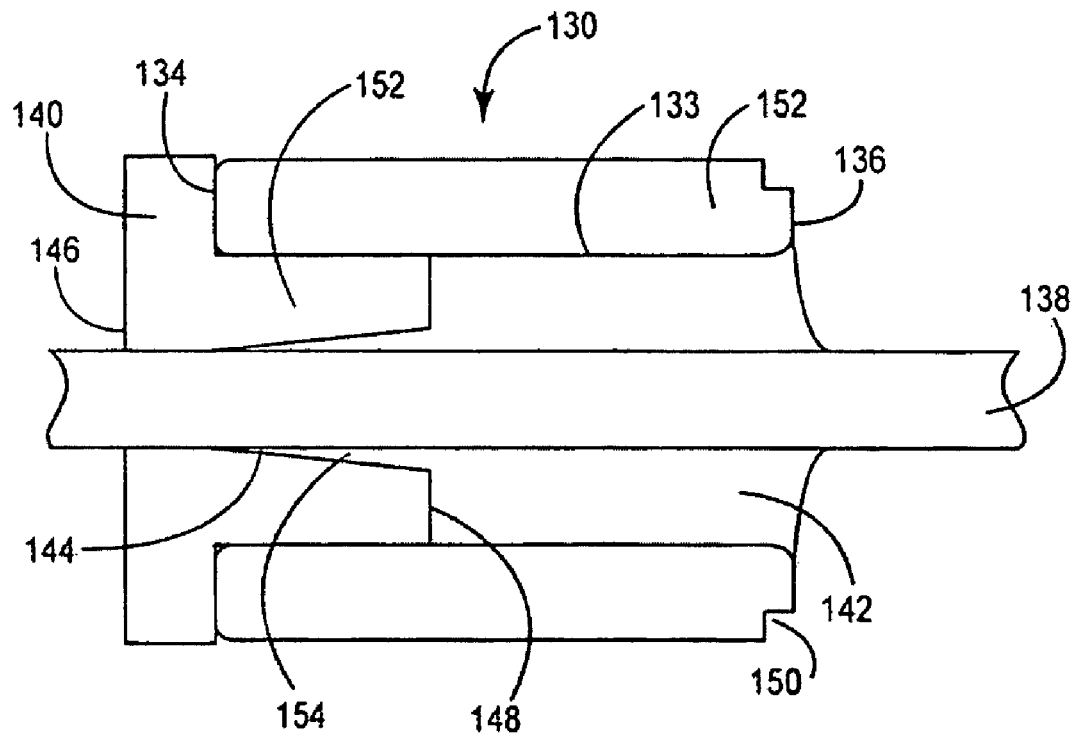
FIG. 11 is a cross-sectional view of a feedthrough assembly in accordance with a first embodiment of the present invention.

FIG. 11 is a cross-sectional view of a feedthrough assembly 130 in accordance with a first embodiment of the present invention. As can be seen, feedthrough assembly 130 comprises a ferrule 132 (e.g. titanium), a polymeric wire-guide member 140 (e.g. polysulfone), and a body of insulating material 142 (e.g. epoxy). Ferrule 132 comprises an aperture having an interior surface 133, a first end 134, and a second end 136. Similarly, polymeric guide 140 comprises an aperture 144, a first end 146, and a second end 148. As illustrated in FIG. 11, first end 146 (e.g. in the form of a cap) is positioned proximate (e.g. abuts) first end 134, and second end 148 (e.g. in the form of a plug) is positioned within ferrule 132. Polymeric wire-guide member 140 may be made of any suitable material such as polysulfone. As is further illustrated, the apertures provided in ferrule 132 and guide member 140 receive and guide an electrical lead 138 through feedthrough assembly 130. More specifically, electrical lead 138, which may be embedded in an electrode (e.g. an anode) internal to an electrochemical cell, is received by first end 146 of guide member 140, passes through feedthrough assembly 130, and exits through second end 136 of ferrule 132. Electrical lead 138 is contacted only by insulating material 136 and polymeric guide member 140 and thus may insulativley pass from the inside to the outside of an electrochemical cell.

Figure 12:
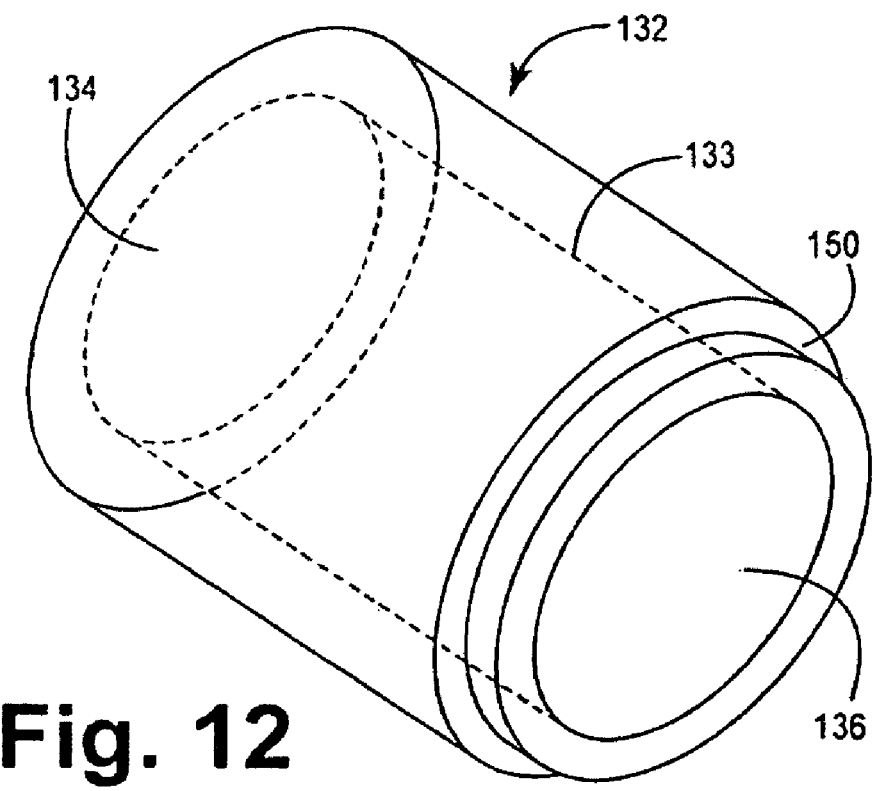
FIG. 12 is an isometric view of a ferrule suitable for use in conjunction with the feedthrough assembly illustrated in FIG. 6.

FIG. 12 is an isometric view of ferrule 132 shown in FIG. 11. Referring to FIGS. 11 and 12, second end 136 comprises a generally cylindrical portion including a receiving shoulder 150 extending therearound through which electrical lead 138 passes and within which a body of insulating material 142 is disposed. Receiving shoulder 150 facilitates the mounting of feedthrough 130 onto an electrochemical cell wall by abuttingly engaging the interior of the cell wall to provide a circular seam as will be more fully described hereinbelow. Ferrule 132 may have an outer diameter of approximately 0.09 inch and an overall height of approximately 0.08 inch.

Obviously, these dimensions and the internal or external mounting of the ferrule to the case, wall may be varied to suit a particular application. Ferrule 32 may be made of titanium having a grade in the range of one to five, preferably two; however, other suitable metals such as niobium stainless steel, aluminum, copper, etc., may be utilized. It should be appreciated that although ferrule 132 is shown in FIGS. 11 and 12 as being generally cylindrical in shape, ferrule 132 may take other forms depending upon a particular application.

Figure 13:
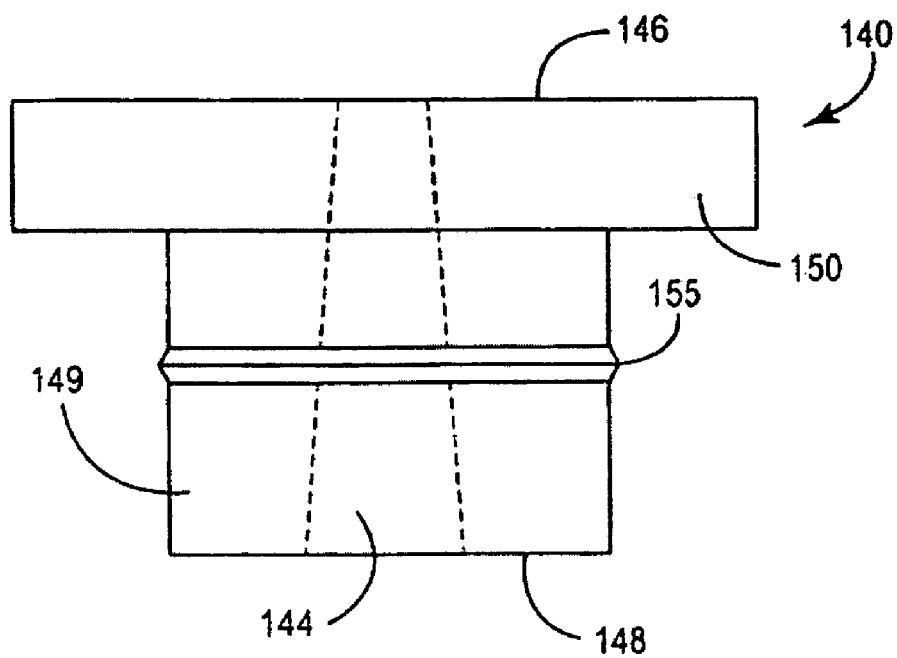
FIGS. 13 and 14 are cross-sectional and isometric views of a guide member suitable for use in conjunction with the feedthrough assembly illustrated in FIG. 11.
Figure 14:
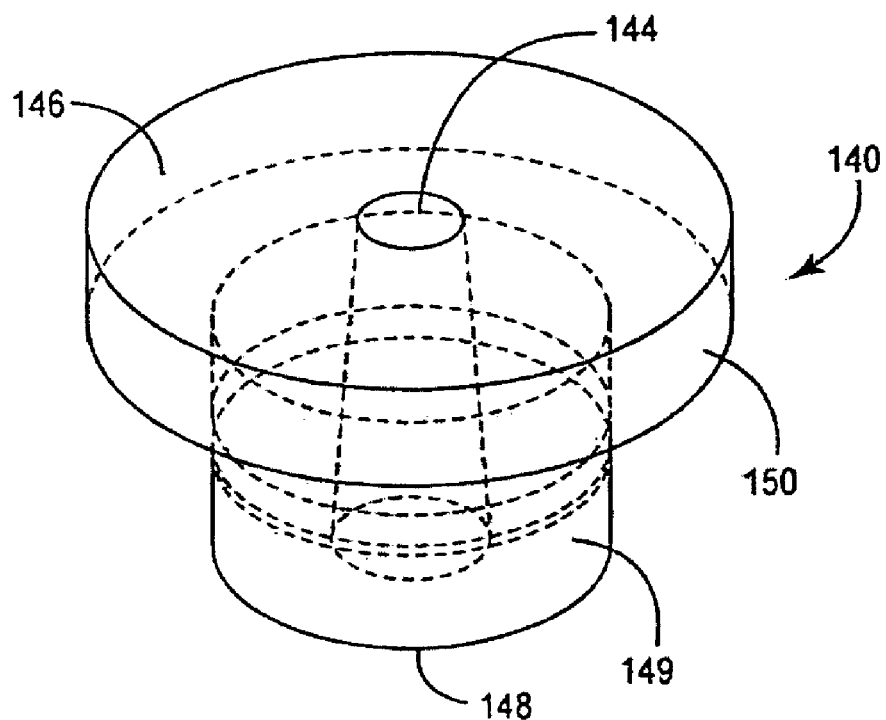

FIGS. 13 and 14 are respective cross-sectional and isometric views of the guide member 140 shown in FIG. 11. As can be seen, guide member 140 comprises a generally cylindrical cap member 150 and a generally cylindrical plug member 149 coupled thereto having an outer diameter smaller than that of cap 150. Cap 150 may have, for example, a height of approximately 0.016 inch and an outer diameter of approximately 0.080 inch while plug 149 may have height of approximately 0.037 inch and an outer diameter of approximately 0.045 inch. Guide member 140 is also provided with an aperture 144 therethrough for receiving and guiding electrical lead 138. It can be seen that the diameter aperture 144 gradually increases from first end 146 to second end 148 thus giving aperture 144 a tapered or partially conical shape. In this way, aperture 144 is configured to partially contact and fix lead 138 in place proximate first end 146 while simultaneously providing a space 154 between the inner surface of aperture 144 and lead 138 for receiving insulating material 142 therein (FIG. 11). For example, aperture 144 may have an inner diameter proximate first end 146 of approximately 0.013 inch, an inner diameter proximate second end 148 of approximately 0.0204 inch, and a length of approximately 0.050 inch. Depending upon the angle formed between inner surface of aperture 144 and the longitudinal axis of lead 138 and further depending upon the type of insulating material utilized, insulating material 142 may substantially fill space 154 as will be more fully described hereinbelow. It should be appreciated that the dimensions and shape of guide member 140 as well as the material from which it is made may vary depending upon its intended application. Suitable materials include polyetheretherketone, polyamideimide, poyacetal, polyphenylene sulphide, syndiotactic polystyrene, polyetherimide, polytetrafluoroethylene, etc. to mention only a few.

Referring again to FIGS. 13 and 14, it can be seen that plug 149 is provided with a raised portion 155 (e.g. a ridge) protruding outward therefrom. The dimensions of raised portion 155 are such that, upon pressing fitting plug 149 into first end 134 of ferrule 132, raised portion 155 frictionally and interferingly engages inner surface 133 so as to secure guide 140 within ferrule 132. Raised portion 155 may, for example, have a height of approximately 0.007 inch and protrude approximately 0.002 inch from the outer surface of plug 149. Raised portion 155 is shown in FIGS. 13 and 14 as being ridge-like in shape and extends entirely around the circumference of plug 149; however, it should be appreciated that raised portion 155 may take any suitable shape (e.g. a bump or a group of bumps) and be positioned at any suitable location on the outer surface of plug 149.

Figure 15:
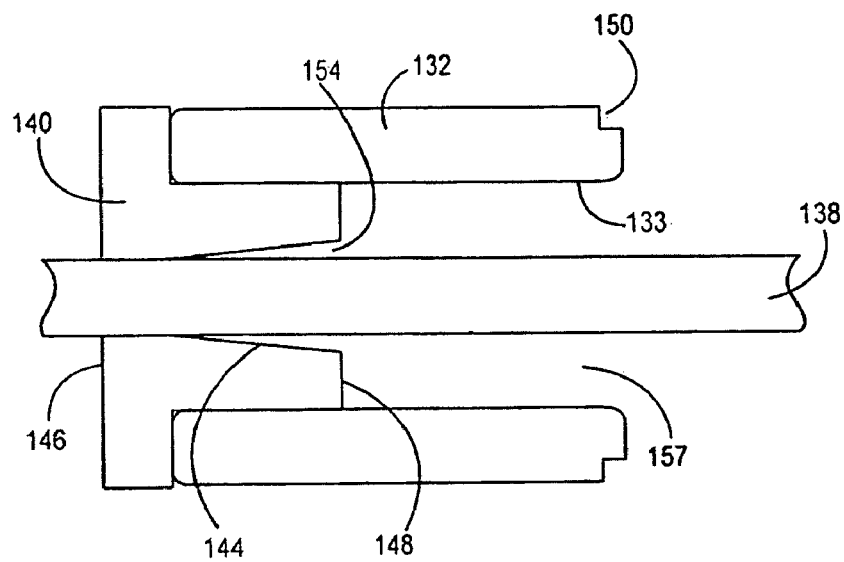
FIG. 15 is a cross-sectional view of the feedthrough assembly illustrated in FIG. 11 before deposition of an insulating material therein.
Figure 16:
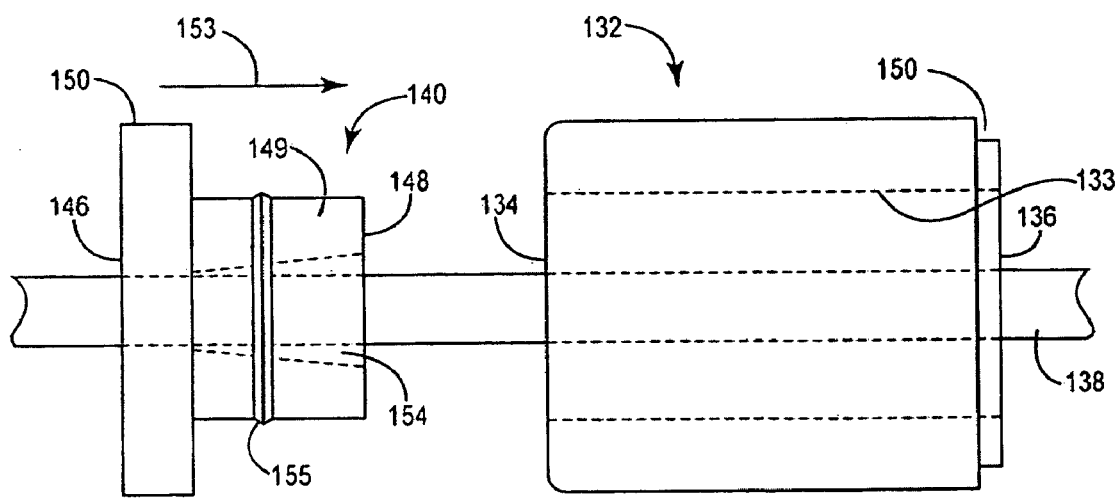
FIG. 16 is an exploded view of the guide member and ferrule illustrated in FIG. 11 positioned on a lead to be pressed fit.

Prior to press-fitting guide member 140 into ferrule 132, guide member 140 is positioned or strung onto lead 138 which in turn passes through ferrule 132 as depicted in FIG. 15. Once in position, guide member 140 may be press fit into ferrule 132 (indicated by arrow 153) so that raised portion 155 frictionally contacts inner surface 133 fixturing guide member 140 proximate first end 134 of ferrule 132. The resulting ferrule/guide member configuration is shown in FIG. 15, which is a cross-sectional view of feedthrough 130 prior to deposition of insulating body 142. It also should be noted that raised portion 155 is not shown in FIG. 15 (or FIG. 11) as it is substantially deformed (i.e. compressed) by inner surface 133 during insertion. Ferrule 132 may be fixedly coupled to an encasement of an electrochemical cell prior to insertion into ferrule 132; however, the cell wall is not shown for clarity.

After the insertion of wire-guide 140 into ferrule 132 and positioning lead 138 through the ferrule, insulating material 136 is deposited into inner cavity 157 of the ferrule/guide member configuration including space 154 through open end 136. Insulating material 142 thus contacts and sealingly engages inner surface 133, guide member 140, and electrical lead 138. If a curable adhesive such as epoxy is deposited within inner cavity 157 of the ferrule/guide member configuration, the insulating material may substantially self-terminate throughout space 154 due to capillary forces. This simplifies manufacture since insulating material does not have to be deposited into the ferrule/guide member configuration with a large degree of accuracy. The degree of termination depends largely on the viscosity of the chosen curable adhesive and the angle formed by inner surface 144 and the longitudinal axis of lead 138. In a preferred embodiment of the present invention an especially strong seal is produced by utilizing urethane acrylate as an insulating material and configuring the guide member so that the angle formed by inner surface and the axis of lead is approximately 4 degrees. A further advantage of utilizing an epoxy such as urethane acrylate is that the resulting feedthrough assembly is relatively flexible as compared to, for example, a glass-to-metal seal. Thus, the arrangement provides strain relief by protecting lead 138 from mechanical stresses. That is, the epoxy fixedly positions the lead with respect to the ferrule and whatever encasement the feedthrough assembly is coupled to and absorbs mechanical stresses placed on the lead. The inventive design also has higher degree of corrosion resistance than do traditional glass-to-metal seals.

Figure 17:
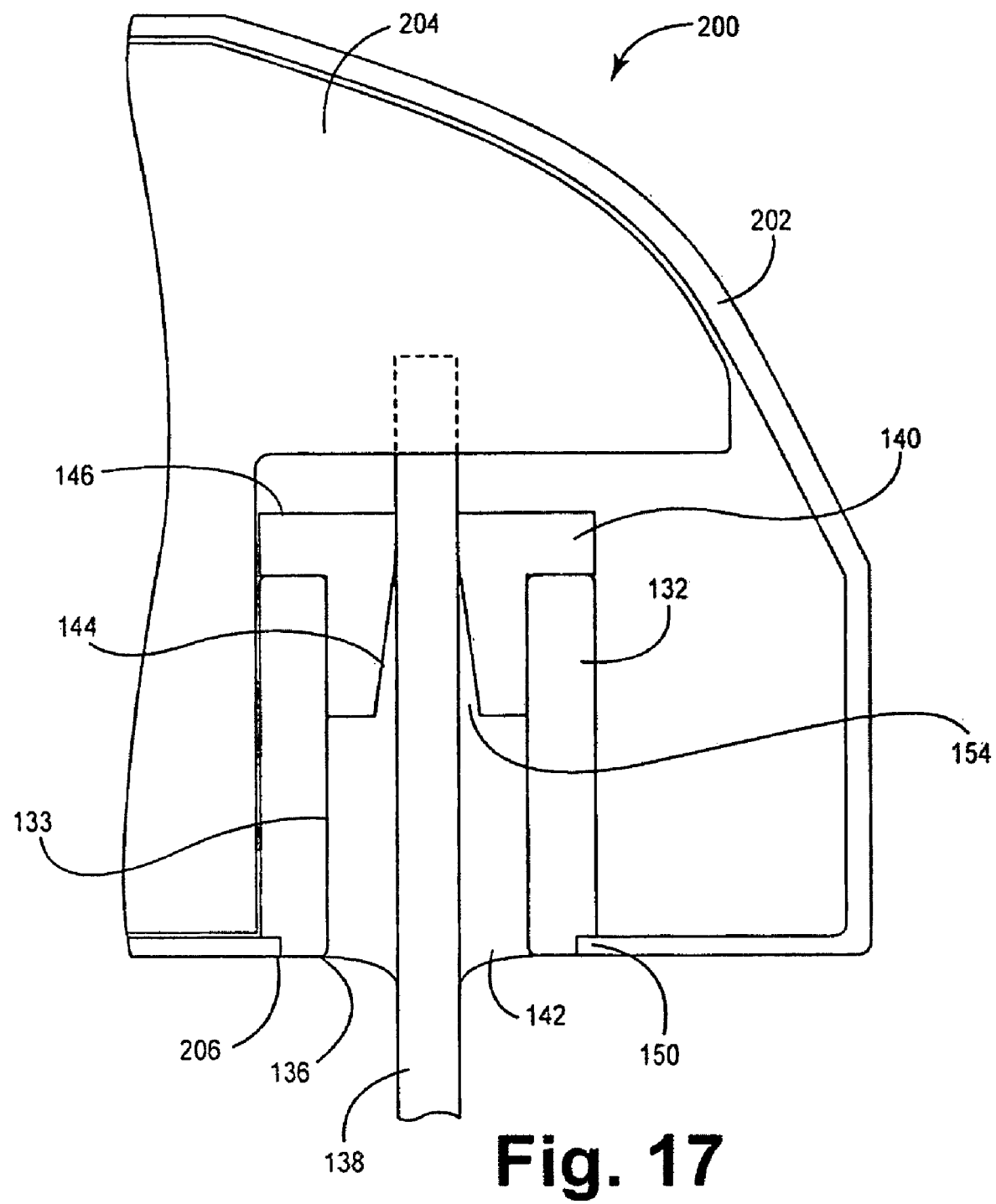
FIG. 17 is cross-sectional view of the inventive feedthrough assembly shown in FIG. 11 as deployed in an electrochemical cell.

FIG. 17 is a cross-sectional view of feedthrough assembly 130 (FIG. 11) deployed in conjunction with an electrochemical cell 200 including an encasement 202 and electrode 204. As can be seen, receiving shoulder 150 is fixedly coupled to encasement 202. This is accomplished by first placing receiving shoulder 150 in an abutting relationship with the edges of an aperture in encasement 202. This results in the production of a circular seam 206 at the exterior of encasement 202 which facilitates coupling (e.g. via laser welding) ferrule 132 to encasement 202. After ferrule 132 has been fixedly coupled to encasement 202, electrical lead 138 extending from electrode 204 and partially embedded therein is passed through aperture 144 of guide member 140 which partially contacts lead 138 as described above. By passing the lead directly through the feedthrough assembly, the inventive design simplifies assembly by eliminating the need for internal cross-wire welds such as the "J" shaped electrode-to-feedthrough terminal weld joint discussed hereinabove. After ferrule 132 has been coupled to encasement 202 and guide 140 has been properly positioned on lead 138, lead 138 is passed through ferrule 132 and consequently through the aperture in encasement 202. Plug 152 of guide 140 is then press fit into first end 134 of ferrule 132. As described above, this causes raised portion 155 to deform and frictionally engage inner surface 133. Once guide 140 is secured within ferrule 132, insulating material 142 is deposited through open end 136 and, if necessary, is cured (e.g. via an ultraviolet light curing system). It should be appreciated that ferrule 132 was welded to encasement 202 before the pressing fitting of guide member 140 or deposition of insulating material 142. In this way, the inventive assembly avoids subjecting critical components of the feedthrough assembly to thermal stresses caused by ferrule/encasement welding. Finally, electrochemical cell 200 is completed by coupling (e.g. laser welding) a lid (not shown in FIG. 17) to encasement 202.

Thus, there has been provided a miniature epoxy feedthrough assembly for use in electrochemical cells such as capacitors, batteries, and the like for use in implantable medical devices. The inventive feedthrough assembly provides for a polymer-to-metal seal which offers greater chemical stability over conventional glass-to-metal seals in certain chemical electrolyte environments. The inventive design simplifies assembly by eliminating the need for internal cross-wire welds and improves volumetric efficiency by eliminating significant headspace volume in the capacitor. The inventive feedthrough assembly is assembled after mounting the ferrule to the cell wall thus avoiding thermal stresses on critical feedthrough components such as polymeric guide member. Assembly of the above described inventive feedthrough assembly is also relatively simple and inexpensive to manufacture.

While at least one exemplary embodiment has been presented in the foregoing detailed description, it should be appreciated, that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope, of the invention as set forth in the appended claims and the legal equivalents thereof.

What is claimed is:

1. A method for feeding a terminal lead through an encasement wall of an electrochemical device of the type utilized in implantable medical devices to the exterior of said electrochemical device, the method comprising:
    positioning a ferrule having first and second ends through said encasement wall, said ferrule having an interior surface;
    positioning at least one polymeric guide member having an aperture therethrough on said lead before inserting said polymeric guide member into said first end of said ferrule;
    inserting said polymeric guide member into said first end of said ferrule; and
    depositing an insulating material within said second end of said ferrule so as to sealingly engaging said lead and said interior surface.

2. A method according to claim 1 wherein positioning said ferrule comprises welding said ferrule to said encasement along an exterior seam between said second end and an exterior surface of said encasement.

3. A method according to claim 1 wherein said terminal lead is passed through said ferrule before said polymeric guide is inserted into said first end.

4. A method according to claim 1 wherein said polymeric guide member is polysulfone.

5. A method according to claim 1 wherein said insulating material is a curable adhesive.

6. A method according to claim 1 wherein said insulating material is epoxy.

7. A method according to claim 6 wherein said epoxy is urethane acrylate.

8. A method according to claim 1 wherein said encasement comprises a case and a lid, comprising the step of attaching said lid to said case following depositing of said insulating material.

9. A method for feeding a terminal lead through an encasement wall of an electrochemical device of the type utilized in implantable medical devices to the exterior of said electrochemical device, the method comprising:
    positioning a ferrule having first and second ends through said encasement wall, said ferrule having an interior surface;
    positioning at least one polymeric guide member having an aperture therethrough on said lead before inserting said polymeric guide member into said first end of said ferrule; and
    inserting said polymeric guide member into said first end of said ferrule.

10. The method of claim 9 further comprising:
    depositing an insulating material within said second end of said ferrule so as to sealingly engaging said lead and said interior surface.

11. A method according to claim 10 wherein positioning said ferrule comprises welding said ferrule to said encasement along an exterior seam between said second end and an exterior surface of said encasement.

12. A method according to claim 9 wherein said terminal lead is passed through said ferrule before said polymeric guide is inserted into said first end.

* * * * *